… … …

United States Patent

Phillips et al.

[11] Patent Number: 5,936,073
[45] Date of Patent: Aug. 10, 1999

[54] REACTIVE FORMAZAN DYESTUFFS

[75] Inventors: Duncan Adrian Sidney Phillips, Lancs; John Anthony Taylor, Manchester, both of United Kingdom; Wen-Jang Chen, Taoyuan, Taiwan

[73] Assignee: Everlight USA, Inc., Pineville, N.C.

[21] Appl. No.: 09/205,353

[22] Filed: Dec. 4, 1998

[51] Int. Cl.$^6$ ............ C09B 62/503; C09B 62/018
[52] U.S. Cl. ........................... 534/618; 534/612
[58] Field of Search ............................... 534/618

[56] References Cited

U.S. PATENT DOCUMENTS

| | | | |
|---|---|---|---|
| 3,926,942 | 12/1975 | Yelland | 534/618 |
| 4,507,236 | 3/1985 | Seiler et al. | 534/618 X |
| 4,556,706 | 12/1985 | Hegar et al. | 534/618 |
| 4,925,928 | 5/1990 | Tzikas | 534/618 |
| 5,041,540 | 8/1991 | Pandl et al. | 534/618 |

*Primary Examiner*—Fiona T. Powers
*Attorney, Agent, or Firm*—Bacon & Thomas, PLLC

[57] ABSTRACT

The present invention provides the reactive formazan dyestuffs of the following formula (I),

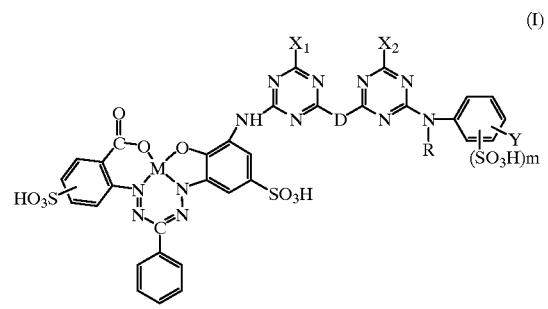

wherein m, Y, R, $X_1$, $X_2$, and M are defined in this document. These kinds of dyestuffs have deep-dyeing ability, and they are suitable for dyeing and printing of materials containing either cellulose fibers, such as cotton, synthetic cotton, hemp, and synthetic hemp.

11 Claims, No Drawings

REACTIVE FORMAZAN DYESTUFFS

FIELD OF THE INVENTION

The present invention relates to a reactive dyestuff, especially relates to a novel blue reactive dyestuff.

SUMMARY OF THE INVENTION

The present invention provides the blue reactive dyestuffs of the following formula (I):

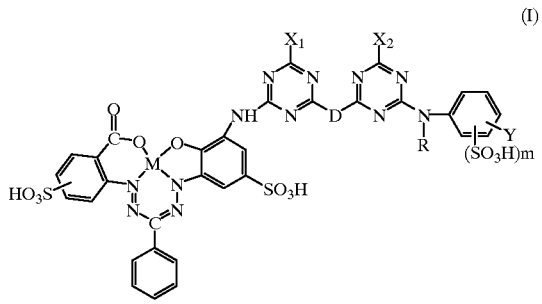

(I)

wherein:

m is 0 or 1;

Y is $-SO_2CH_2=CH_2$, $-SO_2C_2H_4W$, $-NHCOCHTCH_2T$, or $-NHCOCT=CH_2$; W is $-Cl$, $-Br$, or $-OSO_3H$; T is $-OH$, $-Cl$, $-Br$, or $-OSO_3H$;

R is H or $C_{1-4}$ alkyl;

$X_1$ and $X_2$ each independent is $-F$, $-Cl$, $-Br$, or quaternary ammonium;

M is Cu or Ni;

D is

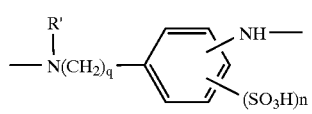

or

wherein n is 0, 1 or 2; q and p each independent is integer from 0 to 4; R' is H or $C_{1-4}$ alkyl.

Examples of D represents

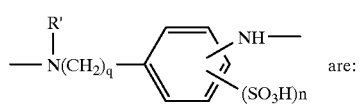 are:

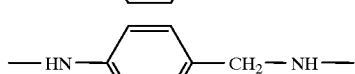

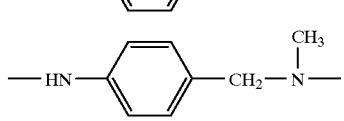

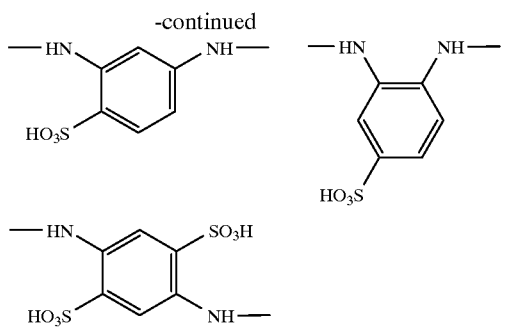

Examples of D represents $-HN-(CH_2)_p-NH-$ are:

$-HNCH_2NH-$, $-HNCH_2CH_2NH-$, $-HNCH_2CH_2CH_2NH-$, $-HNCH_2CH_2CH_2CH_2NH-$.

DESCRIPTION OF THE PREFERRED EMBODIMENTS

The reactive formazan dyestuffs of the formula (I) of the present invention can be synthesized by the following methods:

The preparation of the formula (1)

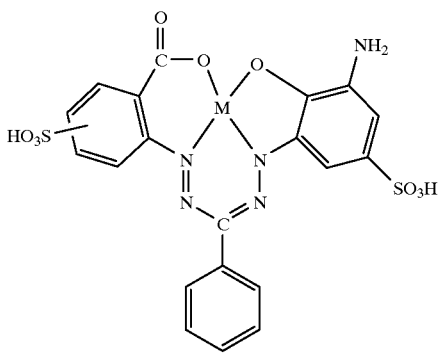

(1)

Wherein M represents Cu or Ni is described in the U.S. Pat. No. 5,410,027 and U.S. Pat. No. 3,926,942. The compound of the formula (1) is reacted with trihalogentriazine of the following formula (2),

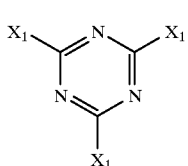

(2)

wherein $X_1$ is defined as the above. The reaction is carried out in aqueous solution at the temperature between 0 to 30° C., and below 20° C. is preferred. The acid generated in the reaction is neutralized by adding the acid-binding agent, and the pH is controlled between 1 to 3. Upon completion the reaction, the mid-product of the following formula (3)

(3)

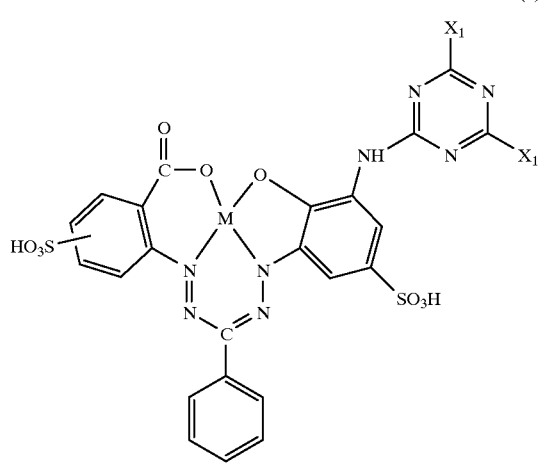

wherein $X_1$ and M are defined as the above, can be obtained.

Then the mid-product of the formula (3) is reacted with the diamino compound of the following formula (4) or (5),

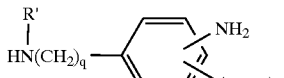
(4)

(5)

wherein n, q, p, and R' are defined as the above. The reaction temperature is controlled between 10 to 80° C., and 20 to 50° C. is preferred. The acid generated in the reaction is neutralized by adding the acid-binding agent. The pH is controlled between 5 to 9, and 6 to 7 is preferred. Upon completion the reaction, the mid-product of the following formula (6) or (7)

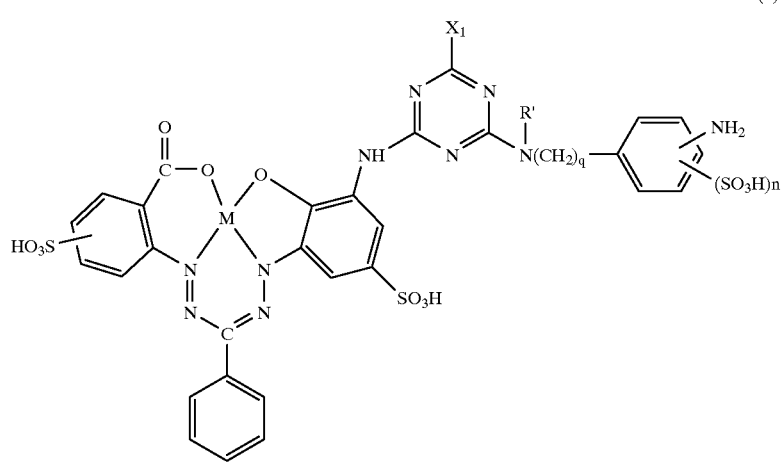
(6)

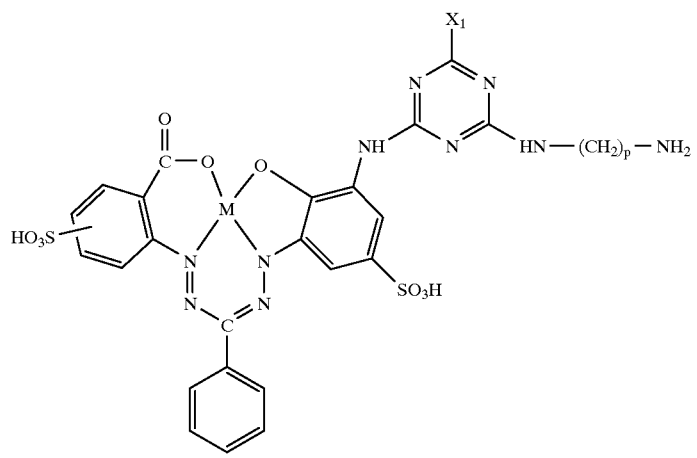
(7)

wherein $X_1$, M, n, q, p, and R' are defined as the above, can be obtained.

After the above reaction is completed, trihalogentriazine of the following formula (8)

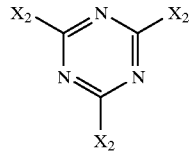

(8)

wherein $X_2$ is defined as the above, is then added to the above solution of the formula (6) or (7). The temperature is controlled between 0 to 30° C., and below 20° C. is preferred. The acid generated in the reaction is neutralized by adding the acid-binding agent, and the pH is controlled between 1.0 to 2.0. Upon completion of the reaction, the mid-product of the following formula (9) or (10)

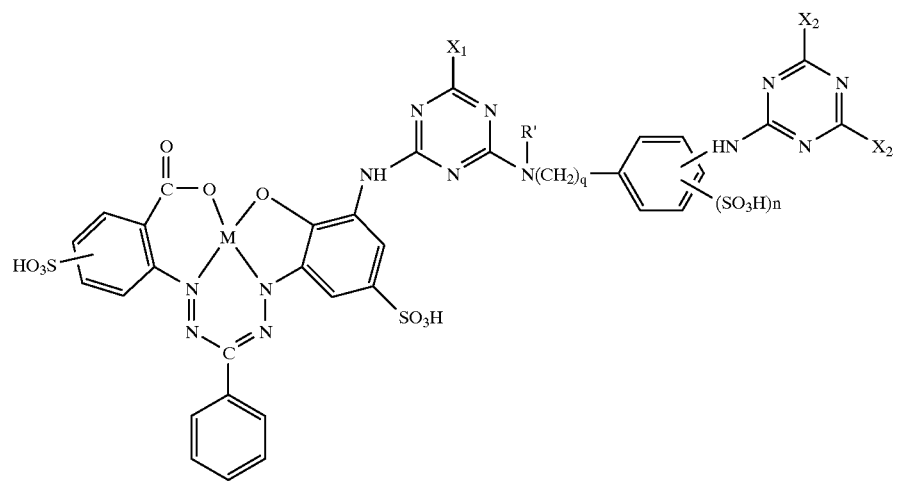

(9)

wherein $X_1$, $X_2$, M, n, q, p, and R' are defined as the above,

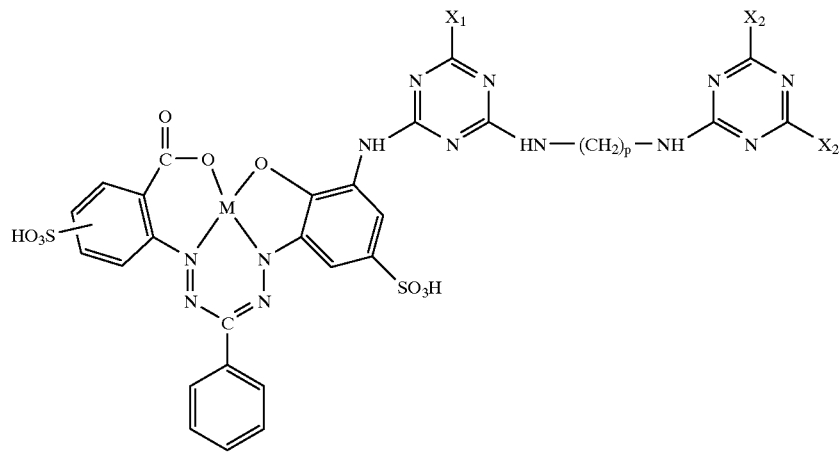

(10)

wherein $X_1$, $X_2$, M, and p are defined as the above, can be obtained.

the reaction, the reactive formazan dyestuff of the following formula (I-a)

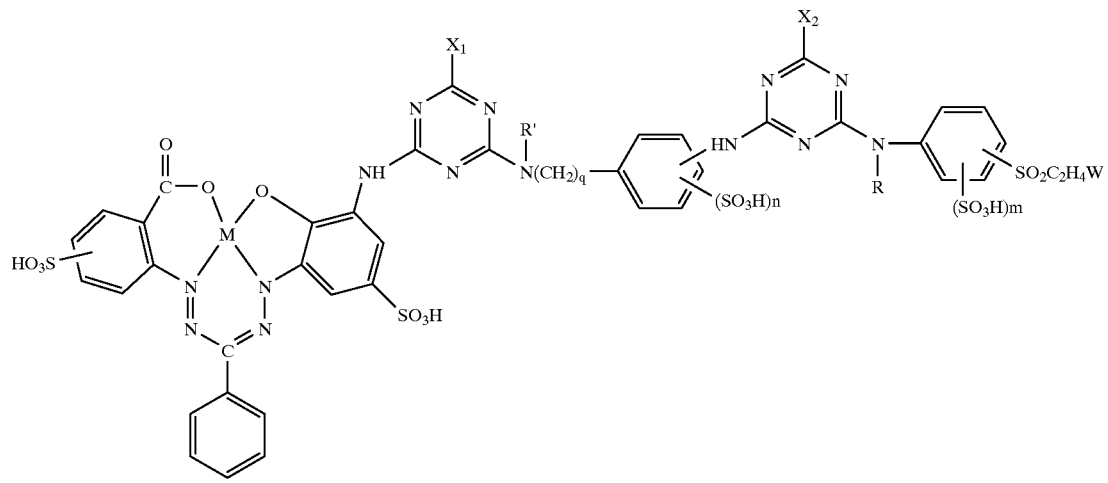

(I-a)

After the above reaction is completed, the compound of the following formula (11),

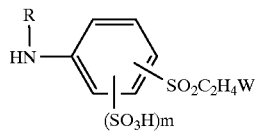

(11)

wherein R, W, and m are defined as the above, is then added to the solution of the formula (9).

Examples of the formula (11) are:

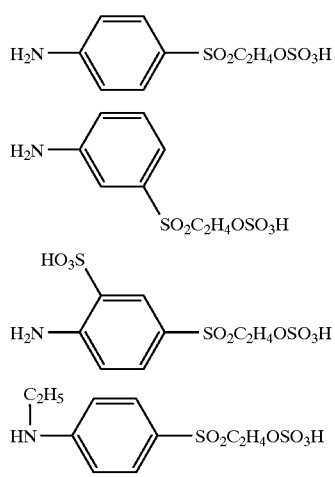

After the compound of the formula (11) is added to the solution of the formula (9), the reaction temperature is controlled between 10 to 80° C., and 20 to 50° C. is preferred. The acid generated in the reaction is neutralized by adding the acid-binding agent, and the pH is controlled between 5 to 9, and 6 to 7 is preferred. Upon completion of wherein $X_1$, $X_2$, M, n, q, m, R', and W are defined as the above, can be obtained. The compound of the formula (I-a) is one of the dyestuffs of the present invention.

The compound of the following formula (12)

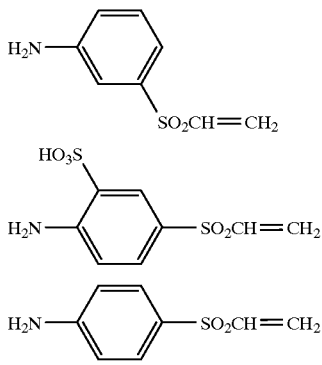

(12)

wherein m and R are defined as the above, is added to the above solution of the formula (9).

Examples of the formula (12) are:

After the compound of the formula (12) is added to the solution of the formula (9), the reaction temperature is controlled between 10 to 80° C., and 20 to 50° C. is preferred. The acid generated in the reaction is neutralized by adding the acid-binding agent, and the pH is controlled between 5 to 9, and 6 to 7 is preferred. Upon completion of the reaction, the reactive formazan dyestuff of the following formula (I-b)

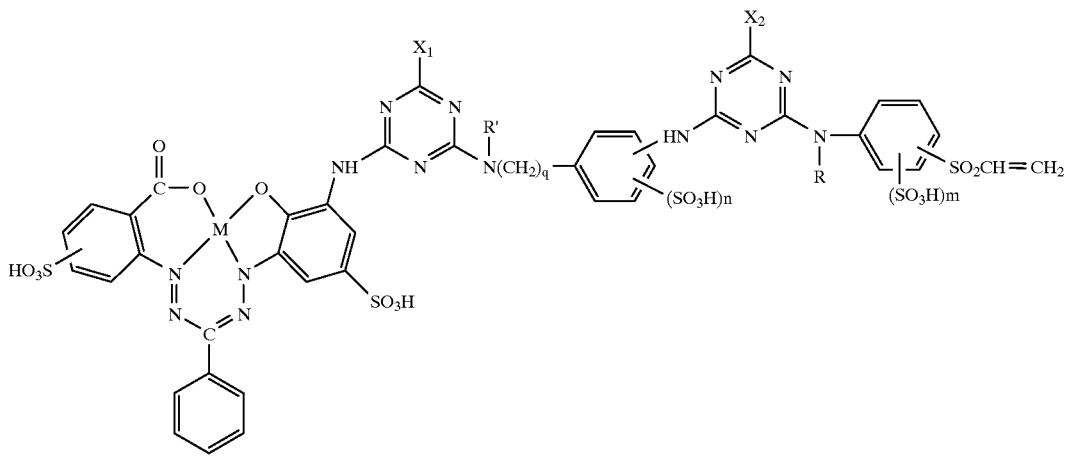

(I-b)

wherein $X_1$, $X_2$, M, n, q, m, R', and W are defined as the above, can be obtained. The compound of the formula (I-b) is one of the dyestuffs of the present invention.

When the above solution of the formula (I-a) is stirred at the temperature below 10° C. and the pH above 9, the reactive formazan dyestuff of the formula (I-b) can also be obtained.

The compound of the formula (13)

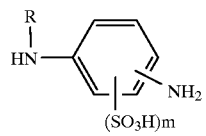

(13)

wherein m and R are defined as the above, is added to the solution of the formula (9). The reactive temperature is controlled between 10 to 80° C., and between 20 to 50° C. is preferred. The acid generated in the reaction is neutralized by adding the acid-binding agent, and the pH is controlled between 5 to 9, and 6 to 7 is preferred. Upon completion of the reaction, the mid-product of the following formula (14)

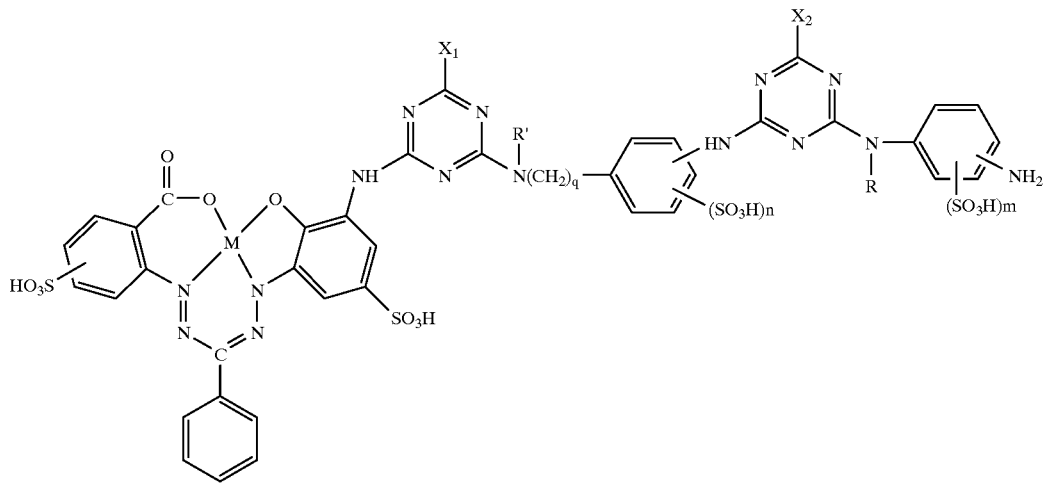

(14)

wherein $X_1$, $X_2$, M, n, q, m, R, and R' are defined as the above, can be obtained.

The 2,3-dibromo propanoyl chloride is added to the above solution of the formula (14) for the condensation reaction. The reaction temperature is controlled between 0 to 25° C., and between 0 to 10° C. is preferred. The pH is controlled between 2 to 7, and 5 to 7 is preferred. Upon completion of the reaction, the reactive formazan dyestuff of the following formula (I-c)

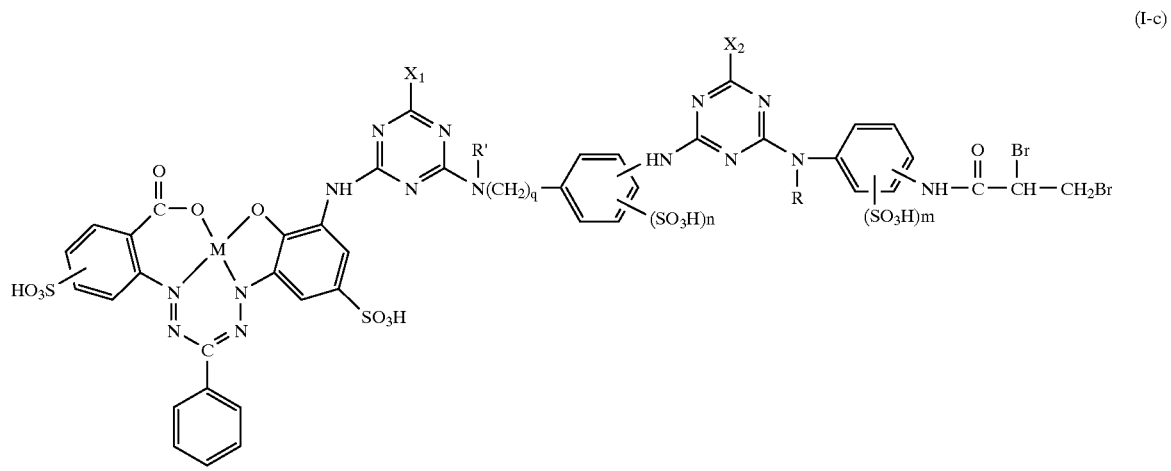

(I-c)

wherein $X_1$, $X_2$, M, n, q, m, R, and R' are defined as the above, can be obtained. The compound of the formula (I-c) is one of the dyestuffs of the present invention.

The solution of the formula (I-c) is stirred at the temperature below 20° C. and the pH above 9. It is preferred that the temperature is controlled between 0 to 5° C. and the pH is between 12 to 12.5. Upon completion of the reaction, the reactive formazan dyestuff of the following formula (I-d)

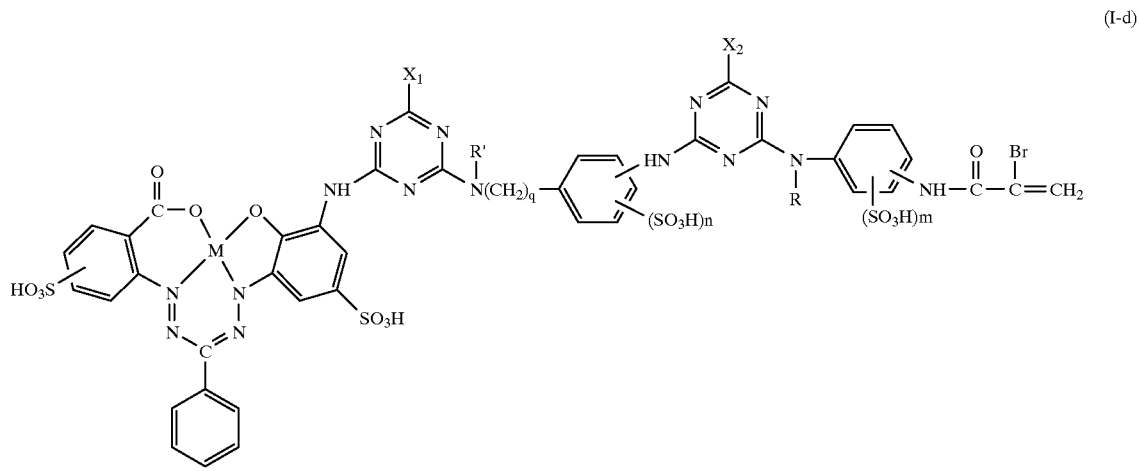

(I-d)

wherein $X_1$, $X_2$, M, n, q, m, R, and R' are defined as the above, can be obtained. The compound of the formula (I-d) is one of the dyestuffs of the present invention.

The compound of the following formula (15)

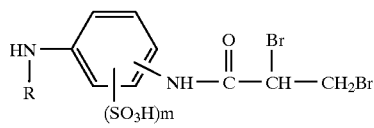

(15)

wherein m and R are defined as the above, is added to the solution of the formula (9), the reaction temperature is controlled between 10 to 80° C., and 20 to 50° C. is preferred. The acid generated in the reaction is neutralized by adding the acid-binding agent, and the pH is controlled between 5 to 9, and 6 to 7 is preferred. Upon completion of the reaction, the reactive formazan dyestuff of the following formula (I-c) can be obtained. The compound of the formula (I-c) is one of the dyestuffs of the present invention.

When the solution of the formula (13) is condensed with 2,3-dibromo propanoyl chloride, the compound of the formula (15) can be obtained. The reaction temperature is controlled between 0 to 25° C. and the pH is controlled between 2 to 7.

If the mid-product of the formula (9) is replaced by the mid-product of the formula (10) for the above condensing reaction, the reactive formazan dyestuffs of the formula (I), wherein D is —HN—(CH$_2$)$_p$—NH— can also be obtained.

The blue formazan dyestuffs of the present invention can also be synthesized by the following methods:

First, the compound of the formula (11), (12), or (15) and trihalogentriazine of the formula (8) are together put in the reactor, and water is used as the solvent. The temperature is controlled between 0 to 30° C., and below 20° C. is preferred. The acid generated in the reaction is neutralized by adding the acid-binding agent, and the pH is controlled between 1 to 3. Upon completion of the reaction, the mid-product of the following formula (16)

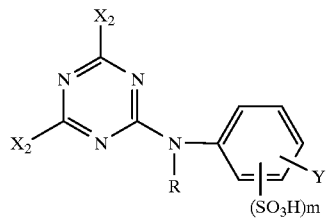

(16)

wherein X$_2$, m, R, and Y are defined as the above, can be obtained.

After the above reaction is completed, the compound of the formula (4) or (5) is added to the solution of the formula (16). The reaction temperature is controlled between 10 to 80° C., and 20 to 50° C. is preferred. The acid generated in the reaction is neutralized by adding the acid-binding agent. The pH is controlled between 5 to 9, and 6 to 7 is preferred. Upon completion of the reaction, the mid-product of the following formula (17) or (18)

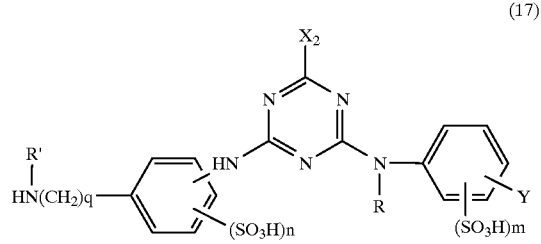

(17)

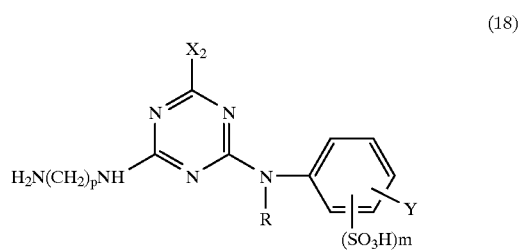

(18)

wherein X$_2$, Y, n, q, p, m, R, and R' are defined as the above, can be obtained.

Trihalogentriazine of the formula (2) is added to the solution of the formula (17). The temperature is controlled between 0 to 30° C., and below 20° C. is preferred. The acid generated in the reaction is neutralized by adding the acid-binding agent, and the pH is controlled between 1 to 3. Upon completion of the reaction, the mid-product of the following formula (19)

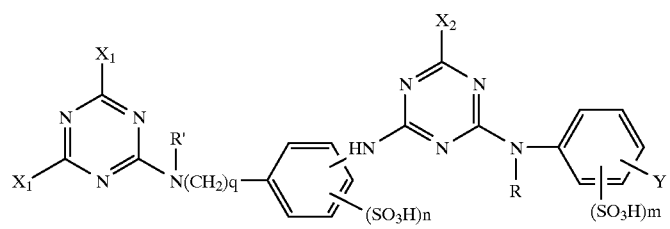

(19)

wherein $X_1$, $X_2$, Y, n, q, m, R, and R' are defined as the above, can be obtained.

The trihalogentriazine of the formula (2) is added to the solution of the formula (18). The temperature is controlled below 20° C. The acid generated in the reaction is neutralized by adding the acid-binding agent, and the pH is controlled between 1 to 3. Upon completion of the reaction, the mid-product of the following formula (20)

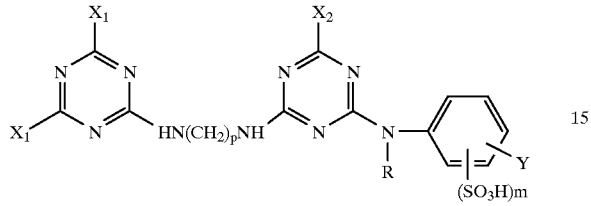
(20)

wherein $X_1$, $X_2$, Y, n, q, m, R, and R' are defined as the above, can be obtained.

After the above reaction is completed, the formazan of formula (1) is added to the solution of the formula (19). The temperature is controlled between 10 to 80° C., and between 20 to 50° C. is preferred. The acid generated in the reaction is neutralized by adding the acid-binding agent, and the pH is controlled between 5 to 9, and 6 to 7 is preferred. Upon completion of the reaction, the reactive formazan dyestuff of the following formula (I-e)

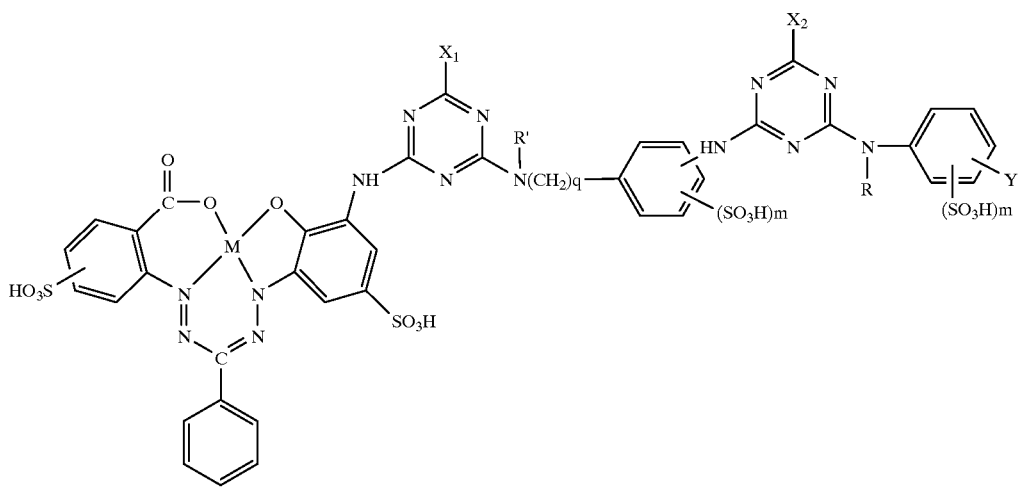
(I-e)

wherein $X_1$, $X_2$, Y, M, n, q, m, R, and R' are defined as the above can be obtained. The compound of the formula (I-e) is one of the dyestuffs of the present invention.

The formazan of the formula (1) is added to the above solution of the formula (20). The temperature is controlled between 10 to 80° C., and between 20 to 50° C. is preferred. The acid generated in the reaction is neutralized by adding the acid-binding agent, and the pH is controlled between 5 to 9, and 6 to 7 is preferred. Upon completion of the reaction, the reactive formazan dyestuff of the following formula (I-f)

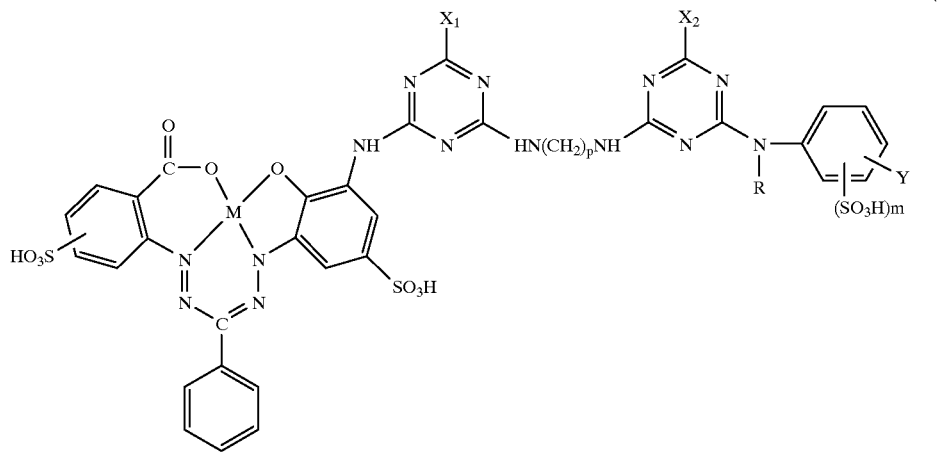

wherein $X_1$, $X_2$, Y, M, p, m, and R are defined as the above, can be obtained. The compound of the formula (I-f) is one of the dyestuffs of the present invention.

The suitable acid-binding agents are alkali metal hydroxides, alkali metal carbonates, or alkali metal bicarbonates. The hydroxides, carbonates, or bicarbonates of sodium, potassium, or lithium are valuable, and particularly sodium carbonates or bicarbonates are most valuable.

The dyestuffs of the present invention can be produced by the above methods, and the reaction conditions were fully described in the above explanation. The dyestuffs of the present invention can be purified by known processes such as spray drying, precipitation, or filtration.

The dyestuffs of the present invention can be in the form of powder, granular, particle or liquid and an auxiliary reagent, for example, retarding agent, leveling agent, assistant agent, surfactant agent, or dispersing agent may be added.

The dyestuffs of the present invention all contain anion group, such as sulfonyl group. For convenience in statement, they are expressed as free acid in the specification. When the dyestuff of present invention is manufactured, purified or used, it often exist in the form of water soluble salt, especially the alkaline metallic salt, such as sodium salt, potassium salt or ammonium salt.

More detailed examples are used to illustrate the present invention, and these examples are used to explain the present invention. The examples below, which are given simply by way of illustration, must not be taken to limit the scope of the invention.

These kinds of dyestuffs have deep-dyeing ability, and they are suitable for dyeing and printing of materials containing either cellulose fibers, such as cotton, synthetic cotton, hemp, and synthetic hemp. Materials of high degree light and wet fastness can be obtained. Also materials of good fastness on other characteristics can be obtained.

For further explanation, the following examples are mentioned for clear illustration.

The following examples are the further explanation of the present invention, however, the present invention field is not limited by these examples. The compounds are in the form of ionic acid, but in reality the form could be metal salts. Alkali metal salts are possible, in particular of the sodium salts.

EXAMPLE 1

Trichlorotriazine (19.0 g) was first uniformly distributed in ice water (300 ml), then 4-((2-(sulfooxy) ethyl) sulfonyl) phenylamine) (28.1 g) was added. At the temperature below 15° C., sodium bicarbonate was added into the solution to control the pH between 1 to 2. Then 1,4-diaminobenzene (10.8 g) was added. The temperature was raised to 40° C. and the pH was controlled between 6.0 to 6.5 until full reaction. Then the temperature was cooled down to 15° C., and trichlorotriazine (19.0 g) was added. At the temperature below 15° C., sodium bicarbonate was added into the solution to control the pH between 1 to 2. Upon completion of the reaction, the formazan of the formula (21) (59.6 g) was obtained.

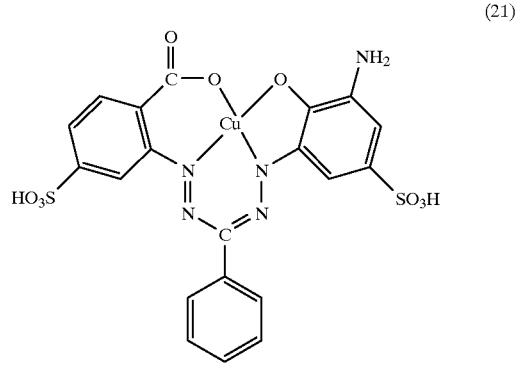

Then the temperature was raised to 40° C., and sodium bicarbonate was used to control the pH between 6.0 to 6.5. Until full reaction, the reactive formazan dyestuffs of the formula (I-1) could be obtained, V $\lambda$max=623.6 nm. After drying and grinding, a blue dye powder could be obtained. The dyestuff can be used to dye objects in blue, with excellent property.

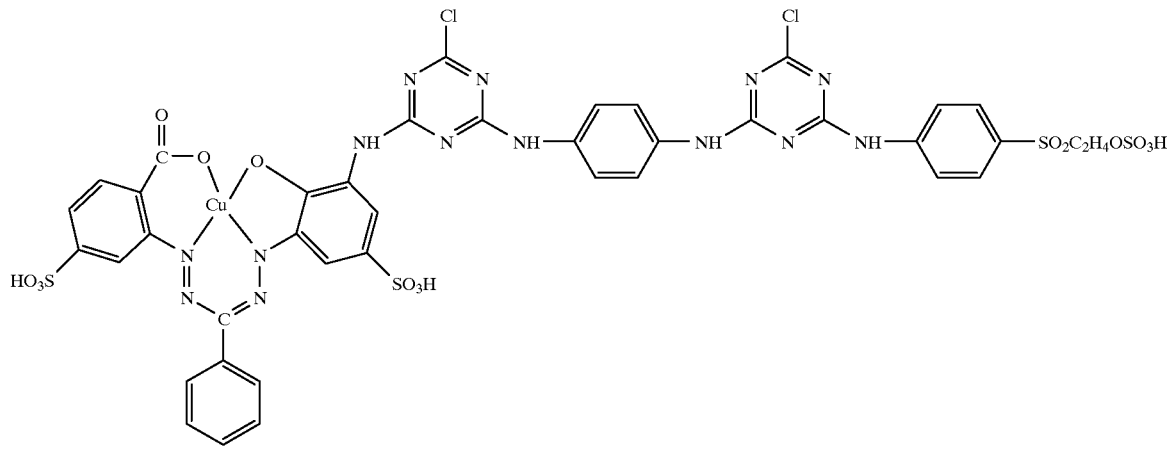

(I-1)

EXAMPLE 2

Refer to the procedure of example 1, substitute 1,4-diaminobenzene with 2,4-diamino benzene sulfonic acid to obtain the reactive formazan dyestuffs of the formula (I-2), UV $\lambda_{max}$=619.6 nm. After drying and grinding, a blue dye powder could be obtained. The dyestuff can be used to dye objects in blue, with excellent property.

EXAMPLE 3

Refer to the procedure of example 1, substitute 1,4-diaminobenzene with 3,4-diamino benzene sulfonic acid to obtain the reactive formazan dyestuffs of the formula (I-3), and formula (I-3') UV $\lambda_{max}$=614.4 nm. After drying and grinding, a blue dye powder could be obtained. The dyestuff can be used to dye objects in blue, with excellent property.

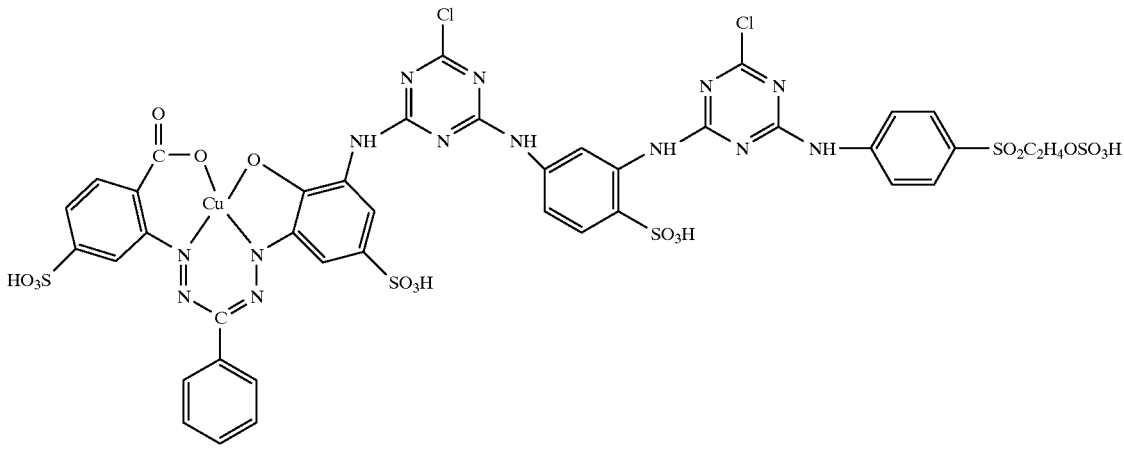

(I-2)

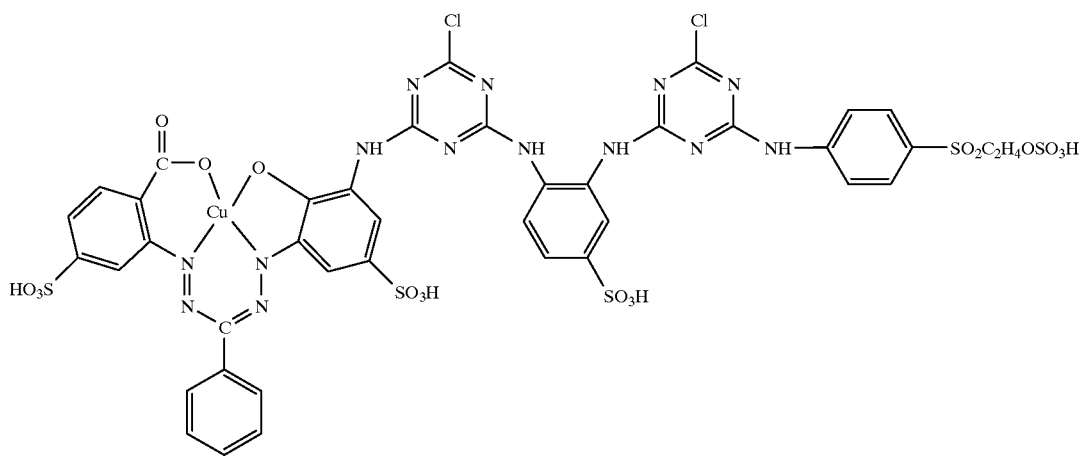
(I-3)
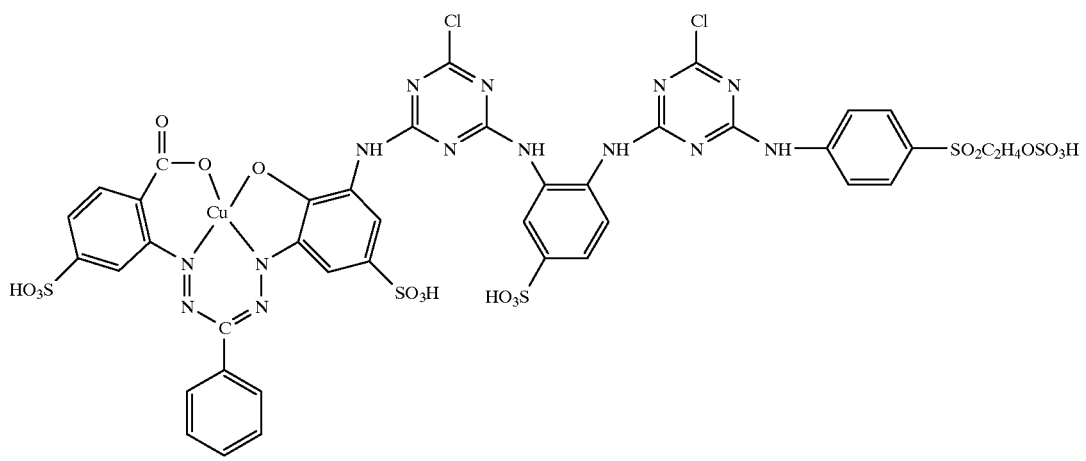
(I-3')
EXAMPLE 4
Refer o the procedure of example 1, substitute 1,4-diaminobenzene with 1,4-diamino benzene 2,5-disulfonic acid to obtain the reactive formazan dyestuffs of the formula (I-4), UV $\lambda_{max}$=609.9 nm. After drying and grinding, a blue dye powder could be obtained. The dyestuff can be used to dye objects in blue, with excellent property.

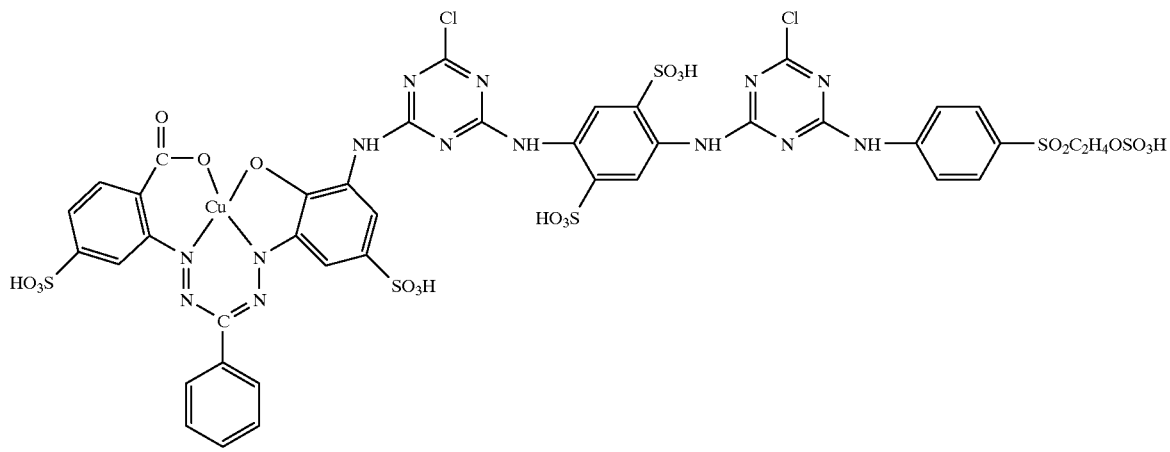

(I-4)

EXAMPLE 5

Refer to the procedure of example 1, substitute 1,4-diaminobenzene with 4-aminobenzylamine to obtain the reactive formazan dyestuffs of the formula (I-5), UV $\lambda_{max}$= 621.8 nm. After drying and grinding, a blue dye powder could be obtained. The dyestuff can be used to dye objects in blue, with excellent property.

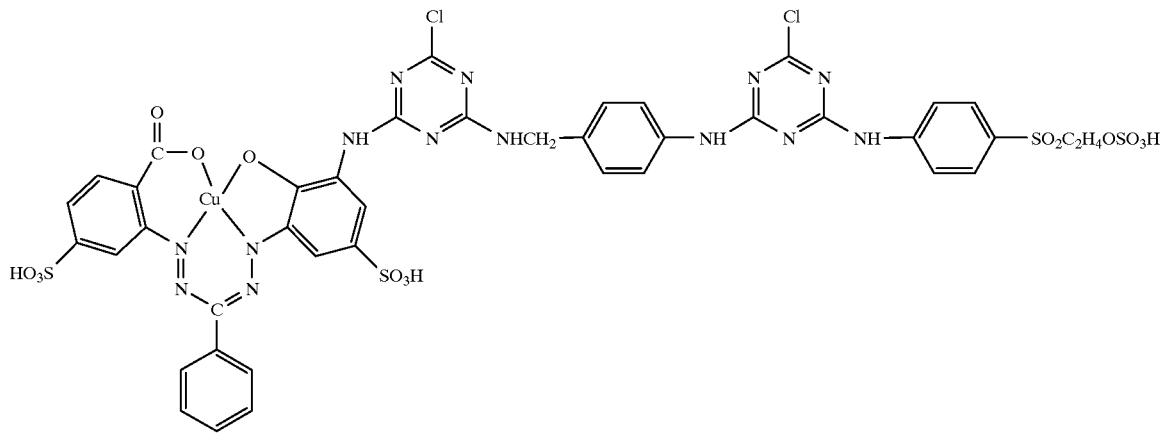

(I-5)

EXAMPLE 6

Refer to the procedure of example 1, substitute 1,4-diaminobenzene with 4-amino N-methyl benzylamine to obtain the reactive formazan dyestuffs of the formula (I-6), UV λmax=622.4 nm. After drying and grinding, a blue dye powder could be obtained. The dyestuff can be used to dye objects in blue, with excellent property.

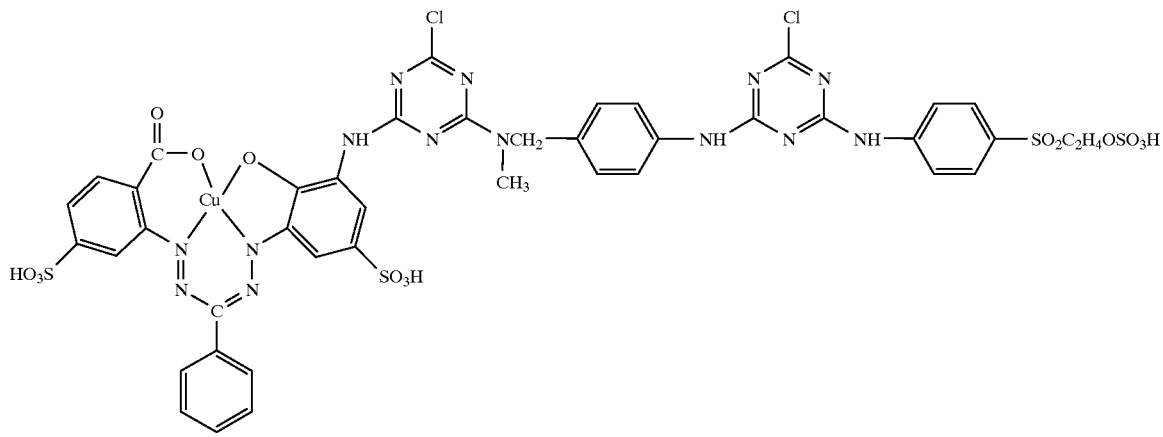

(I-6)

EXAMPLE 7

Refer to the procedure of example 1, substitute 1,4-diaminobenzene with 1,2-ethylene diamine to obtain the reactive formazan dyestuffs of the formula (I-7), UV $\lambda_{max}=$ 615.2 nm. After drying and grinding, a blue dye powder could be obtained. The dyestuff can be used to dye objects in blue, with excellent property.

EXAMPLE 8

Refer to the procedure of example 1, substitute 1,4-diaminobenzene with 1,3-diamino propane to obtain the reactive formazan dyestuffs of the formula (I-8), UV $\lambda_{max}=$ 615.2 nm. After drying and grinding, a blue dye powder could be obtained. The dyestuff can be used to dye objects in blue, with excellent property.

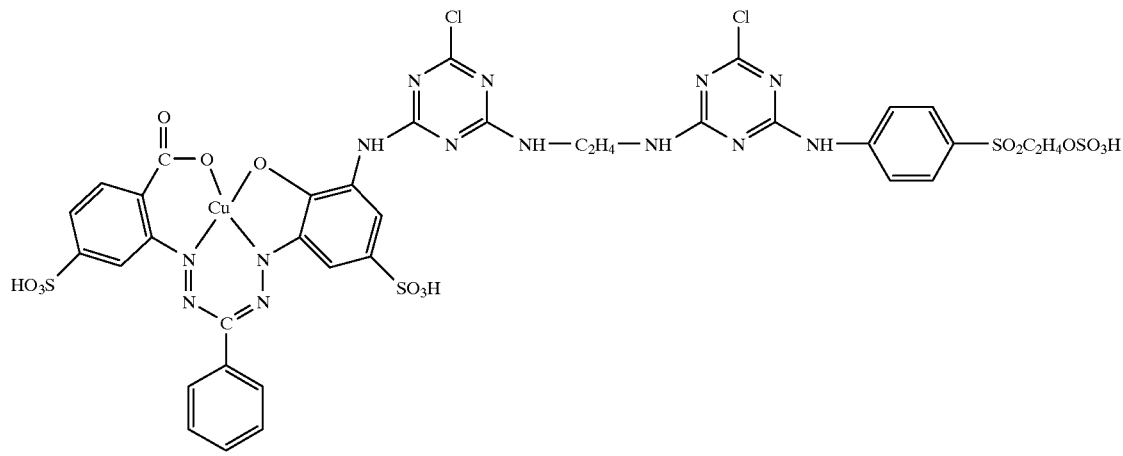

(I-7)

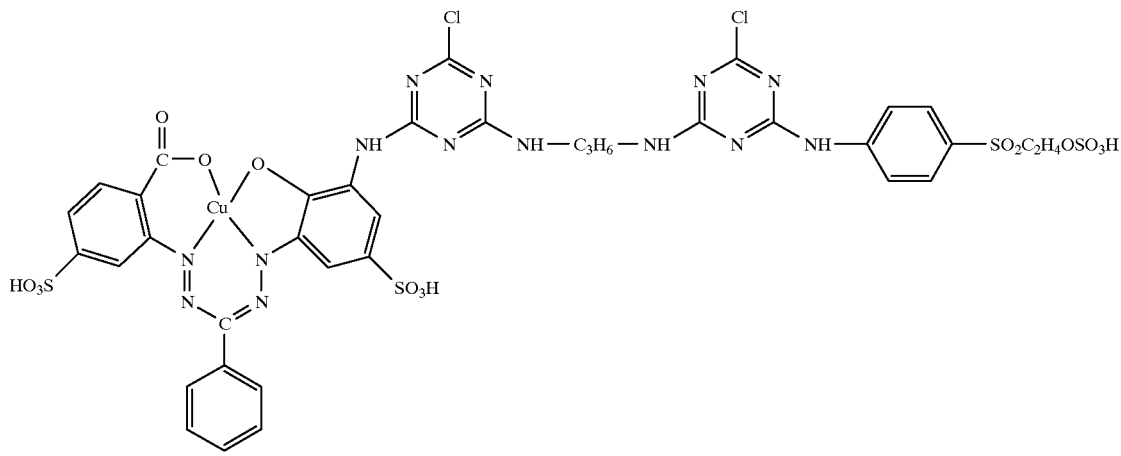

(I-8)

EXAMPLE 9

Refer to the procedure of example 3, substitute 4-((2-(sulfooxy) ethyl) sulfonyl) phenylamine) with 3-((2-(sulfooxy) ethyl) sulfonyl) phenylamine) to obtain the reactive formazan dyestuffs of the formula (I-9) and the formula (I-9'), UV $\lambda_{max}$=612.3 nm. After drying and grinding, a blue dye powder could be obtained. The dyestuff can be used to dye objects in blue, with excellent property.

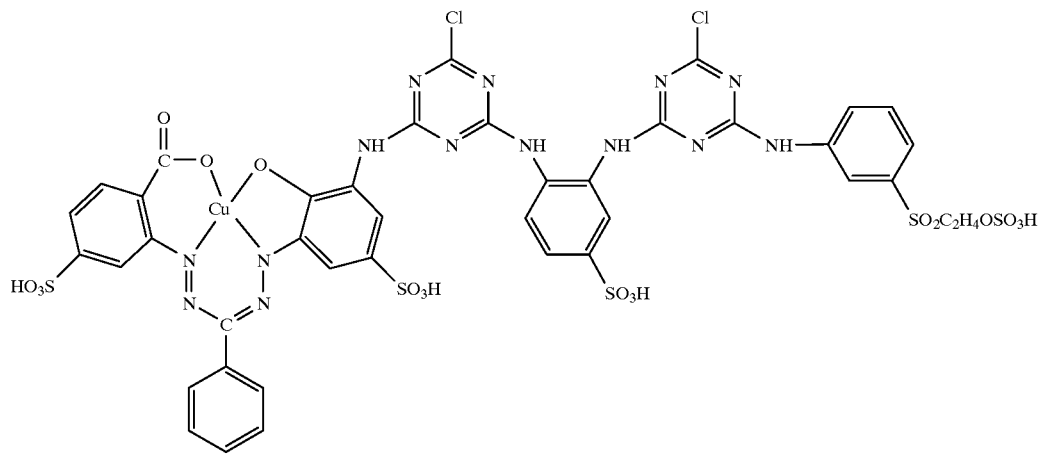

(I-9)

(I-9')

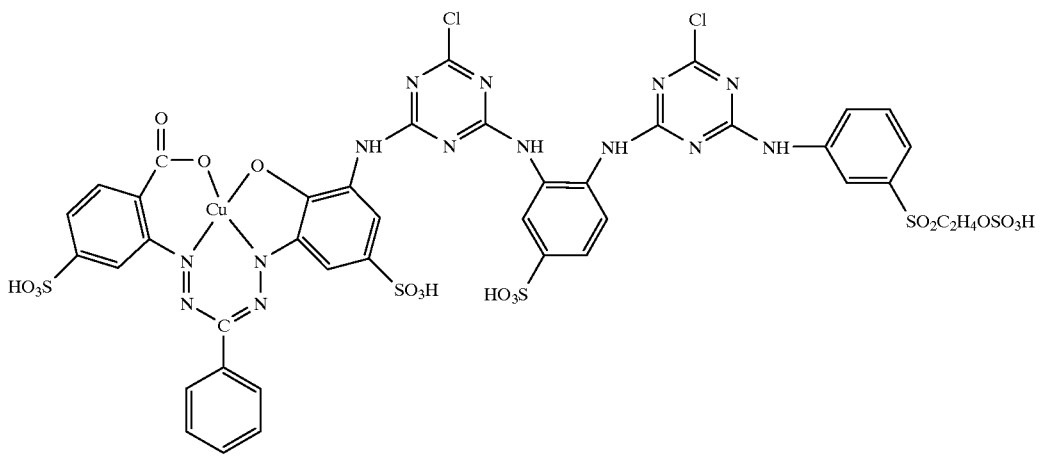

EXAMPLE 10

Refer to the procedure of example 6, substitute the formula (21) with the formula (22)

to obtain the reactive formazan dyestuff of the formula (I-10), UV $\lambda_{max}$=620.2 nm. After drying and grinding, a blue dye powder could be obtained. The dyestuff can be used to dye objects in blue, with excellent property.

(I-10)

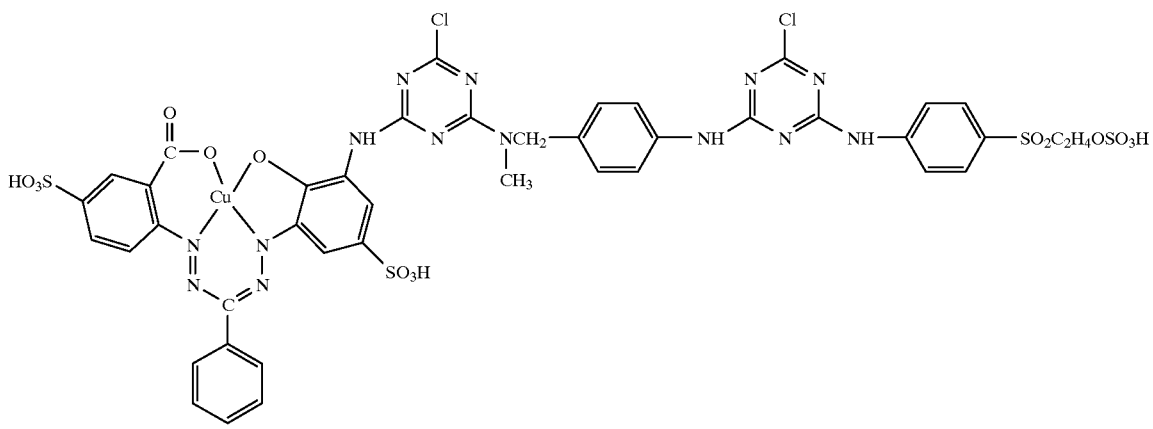

(22)

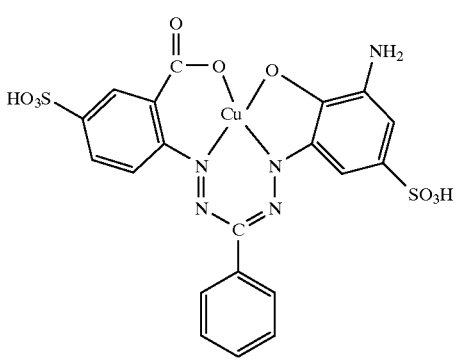

EXAMPLE 11

The dyestuff of the formula (21) (59.6 g) was first uniformly distributed in ice water (300 ml), then trichlorotriazine (19.0 g) was added. At the temperature below 15° C., sodium bicarbonate was added into the solution to control the pH between 1 to 2. Then 1,4-diaminobenzene (10.8 g) was added. The temperature was raised to 40° C. and the pH was controlled between 6.0 to 6.5 until full reaction. Then the temperature was cooled down to 15° C., and trichlorotriazine (19.0 g) was added. At the temperature below 5° C., sodium bicarbonate was added into the solution to control the pH between 1 to 2. A solution of 4-((2-(sulfooxy) ethyl) sulfonyl) phenylamine) (28.1 g) in 150 ml water was added into the above mixture solution. The temperature was raised to 40° C. and the pH was controlled between 6.0 to 6.5. Upon completion of the reaction, the reactive formazan of the formula (I-1) was obtained. UV $\lambda_{max}$=623.6 nm. After drying and grinding, a blue dye powder could be obtained. The dyestuff can be used to dye objects in blue, with excellent property.

EXAMPLE 12

Trichlorotriazine (19.0 g) was added into a solution of 2,4-diamino benzene sulfonic acid (18.8 g) in 300 ml water. The temperature was controlled below 15° C. and the pH was controlled between 1.0–2.0. The solution was stirred until full reaction. At the temperature of 5° C. and the pH of 6.0 to 6.5, 2,3-dibromo propanoyl chloride (7.5 g) was added into the above result solution. Until full reaction, 1,4-diamino benzene-2,5-disulfonic acid (26.8 g) was added. The temperature was raised to 40° C. and the pH was controlled between 6.0 to 6.5. Until full reaction, then the temperature was cooled down to 15° C., and trichlorotriazine (19.0 g) was added. At the temperature below 5° C., sodium bicarbonate was added into the solution to control the pH between 1.0 to 2.0. The dyestuff of the formula (21) (59.6 g) was added into the above mixture solution. The temperature was raised to 40° C. and the pH was controlled between 6.0 to 6.5. Upon completion of the reaction, the reactive formazan of the formula (I-11) was obtained. UV $\lambda$max=620.2 nm. After drying and grinding, a blue dye powder could be obtained. The dyestuff can be used to dye objects in blue, with excellent property.

EXAMPLE 13

2,3-Dibromo propanoyl chloride (7.5 g) was added into a solution of 2,4-diamino benzene sulfonic acid in 150 ml water. The temperature was controlled below 5° C. and the pH was controlled between 5.5–6.0. Stirring until full reaction, then trichlorotriazine (19.0 g) was added. At the temperature of 15° C., sodium bicarbonate was added into the solution to control the pH between 1.0 to 2.0. Until full reaction, 1,4-diamino benzene-2,5-disulfonic acid (26.8 g) was added. The temperature was raised to 40° C. and the pH was controlled between 6.0 to 6.5. Until full reaction, then the temperature was cooled down to 15° C., and trichlorotriazine (19.0 g) was added. At the temperature below 5° C., sodium bicarbonate was added into the solution to control the pH between 1.0 to 2.0. The dyestuff of the formula (21) (59.6 g) was added into the above mixture solution. The temperature was raised to 40° C. and the pH was controlled between 6.0 to 6.5. Upon completion of the reaction, the reactive formazan of the formula (I-12) was obtained. UV $\lambda_{max}$=620.2 nm. After drying and grinding, a blue dye powder could be obtained. The dyestuff can be used to dye objects in blue, with excellent property.

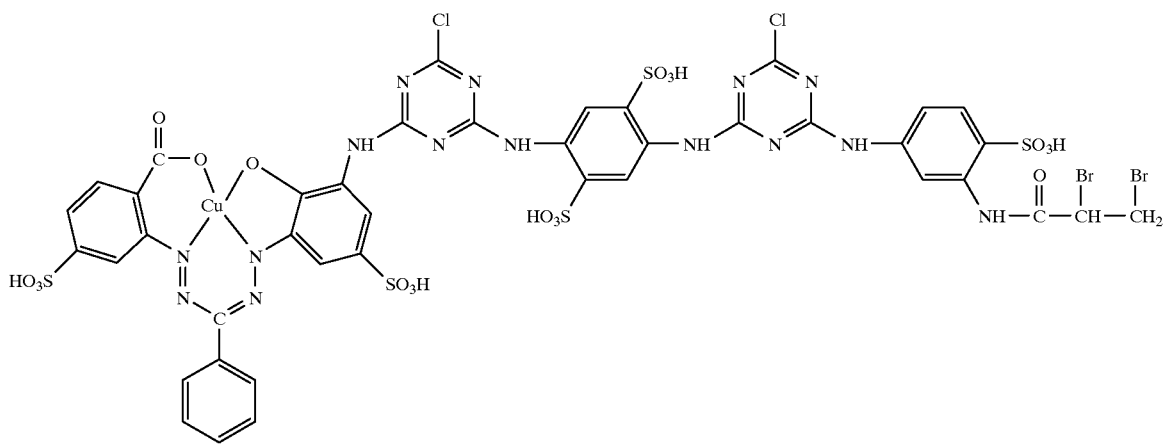

(I-11)

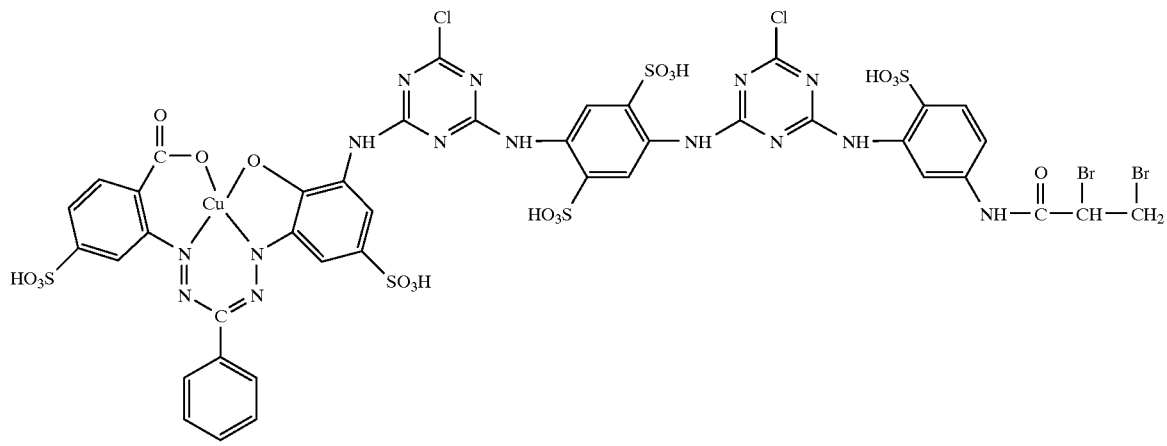

(I-12)

EXAMPLE 14

At the temperature of 5° C., NaOH aqueous solution was added into a solution of the dyestuff of the formula (I-4) (5.5 g) in 100 ml water to control the pH between 12.0–12.5. Stirring until full reaction, then HCl aqueous solution was added into the above result solution to control the pH between 6.5–7.5. Upon completion of the reaction, the reactive formazan of the formula (I-13) was obtained. UV $\lambda_{max}$=620.2 nm. After drying and grinding, a blue dye powder could be obtained. The dyestuff can be used to dye objects in blue, with excellent property.

EXAMPLE 15

At the temperature of 5° C., NaOH aqueous solution was added into a solution of the dyestuff of the formula (I-12) (5.5 g) in 100 ml water to control the pH between 12.0–12.5. Stirring until full reaction, then HCl aqueous solution was added into the above result solution to control the pH between 6.5–7.5. Upon completion of the reaction, the reactive formazan of the formula (I-14) was obtained. UV $\lambda_{max}$=620.2 nm. After drying and grinding, a blue dye powder could be obtained. The dyestuff can be used to dye objects in blue, with excellent property.

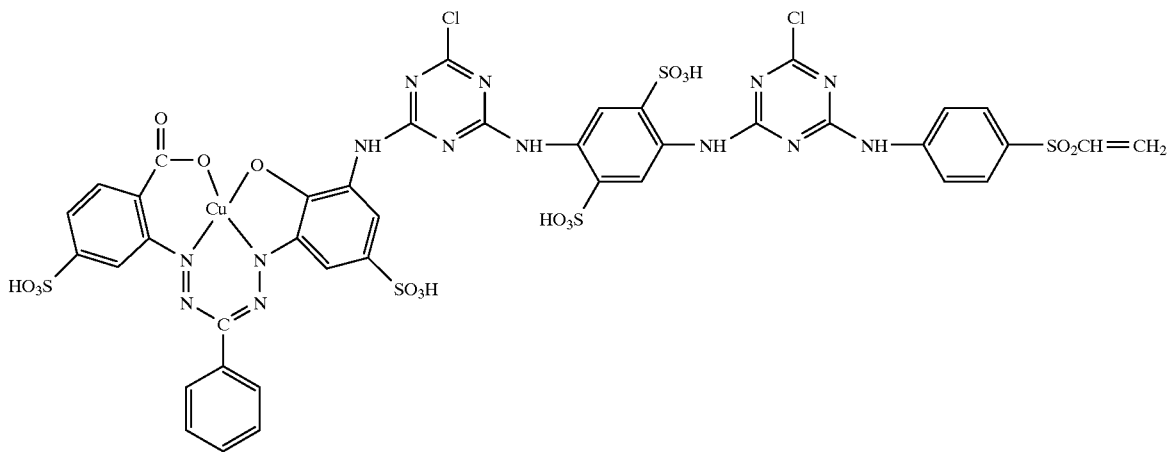

(I-13)

(I-14)

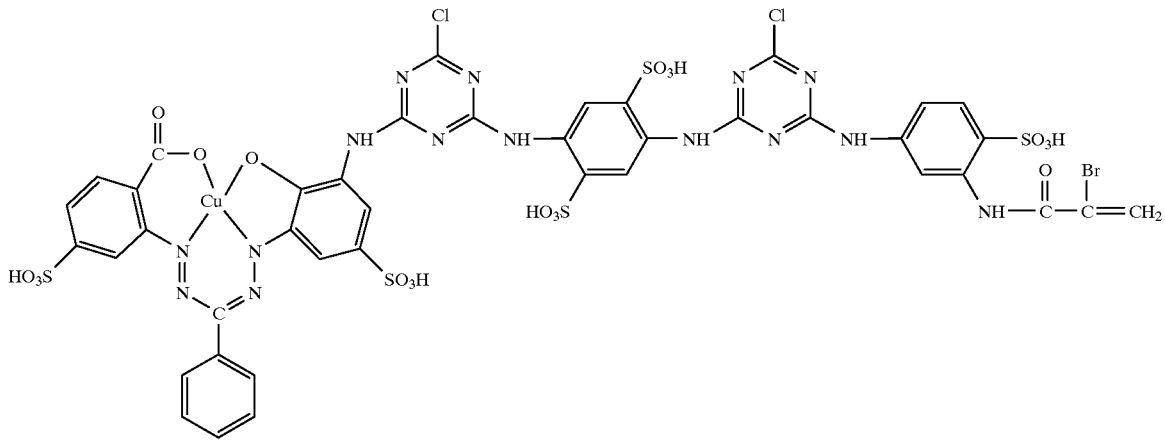

From the foregoing description, one skilled in the art can easily ascertain the essential characteristics of this invention, and without departing from the scope thereof, can make various changes and modifications of the invention to adapt it to various usages and conditions. Thus, other embodiments are also within the claims.

What is claimed is:

1. A reactive formazan dyestuff of the formula (I)

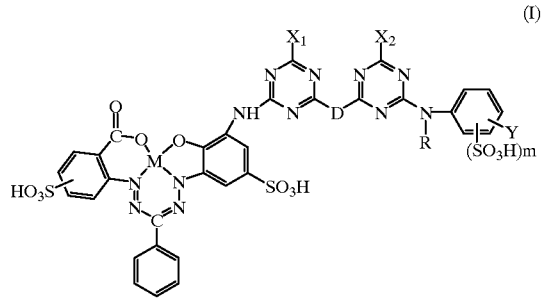

wherein:

m is 0 or 1;

Y is —SO$_2$CH$_2$=CH$_2$, —SO$_2$C$_2$H$_4$W, —NHCOCHTCH$_2$T, or —NHCOCT=CH$_2$; W is —Cl, —Br, or —OSO$_3$H; T is —OH, —Cl, —Br, or —OSO$_3$H;

R is H or C$_{1-4}$ alkyl;

X$_1$ and X$_2$ each independent is —F, —Cl, —Br, or quaternary ammonium;

M is Cu or Ni;

D is

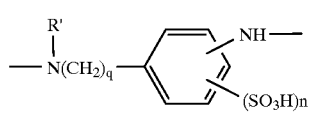

or

—HN—(CH$_2$)$_p$—NH— wherein n is 0, 1 or 2; q and p each independent is integer from 0 to 4; R' is H or C$_{1-4}$ alkyl.

2. A reactive formazan dyestuff of claim 1, wherein Y is —SO$_2$CH$_2$=CH$_2$ or —SO$_2$C$_2$H$_4$W, and W is —Cl, —Br, or —OSO$_3$H.

3. A reactive formazan dyestuff of claim 1, wherein Y is —SO$_2$C$_2$H$_4$W, and W is —OSO$_3$H.

4. A reactive formazan dyestuff of claim 1, wherein Y is —NHCOCHTCH$_2$T or —NHCOCT=CH$_2$, and T is —Cl, —Br, or —OSO$_3$H.

5. A reactive formazan dyestuff of claim 1, wherein T is —Cl or —Br.

6. A reactive formazan dyestuff of claim 4, wherein T is —Cl or —Br.

7. A reactive formazan dyestuff of claim 1, wherein M is Cu.

8. A reactive formazan dyestuff of claim 1, wherein D is

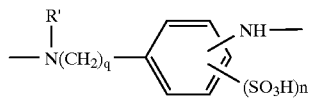

and n is 0, 1 or 2; q is integer from 0 to 4; R' is H or C$_{1-4}$ alkyl.

9. A reactive formazan dyestuff of claim 1, wherein D is

—HN—(CH$_2$)$_p$—NH— and p is integer from 0 to 4.

10. A reactive formazan dyestuff of claim 1, wherein X$_1$ and X$_2$ each independent is —F, or —Cl.

11. A reactive formazan dyestuff of claim 8, wherein n is 1 or 2; and q is 1.

* * * * *